June 13, 1950  C. D. LAIDLEY  2,511,351
LIQUID AND GAS SEPARATOR
Filed Sept. 27, 1944
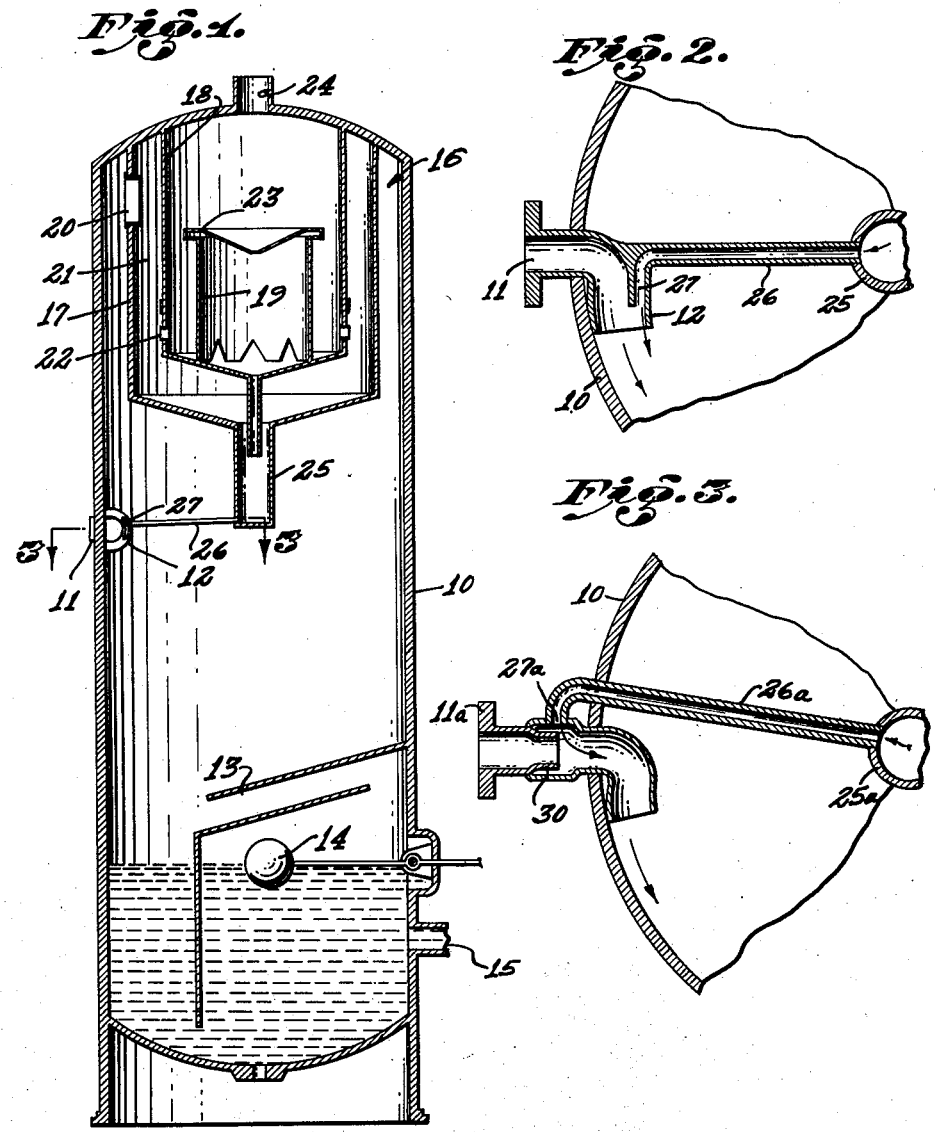
CLARENCE D. LAIDLEY,
INVENTOR.
BY Hazard and Miller
ATTORNEYS Patented June 13, 1950

2,511,351

UNITED STATES PATENT OFFICE 2,511,351

LIQUID AND GAS SEPARATOR

Clarence D. Laidley, Los Angeles, Calif.

Application September 27, 1944, Serial No. 556,040

3 Claims. (Cl. 183—2.7)

This invention relates to a means and method of inducing drainage from mist extractors in liquid and gas separators, and has been primarily designed for use in those separators used for separating oil and gas although it may be employed in other liquid and gas separators wherein similar conditions and circumstances exist.

Heretofore, oil and gas separators have been designed wherein the influent consisting of a mixture of oil and gas is introduced into a tank wherein a primary separation of gas from the oil takes place, the oil settling to the bottom of the tank and the gas rising to the upper portion thereof. In the top of the tank it is customary to employ a mist extractor in which a secondary separation takes place, the mist extractor serving to remove and collect condensed mist from the gas and return the collected mist to the oil through a drainpipe. Usually, the drainpipe from the mist extractor leads downwardly below the oil level in the bottom of the tank for if the drainpipe terminates above the oil level there is apt to be an opportunity for gas to escape upwardly through the drainpipe to the gas outlet without having passed through the mist extractor to have the mist extracted therefrom.

If the drainpipe is extended below the oil level the following situation may and frequently does occur. A considerable pressure drop occurs in conducting the gas through the mist extractor to the gas outlet, this pressure drop being occasioned by the friction and resistance in conducting the gas through the mist extractor in such a manner as to remove the mist therefrom. Sometimes such differential in pressure between the entrance to the mist extractor and the exit therefrom the gas outlet is as much as five pounds. If the oil level in the separator tank is high the oil will naturally rise in the drainpipe and if the pressure drop through the mist extractor is of considerable magnitude situations sometimes occur wherein drainage and oil in the drainpipe is carried upwardly therethrough and into the gas outlet because of the drop in pressure.

An object of the present invention is to provide a method and means for forcibly inducing drainage from the mist extractor so that the above-described situation can never occur, thus assuring proper drainage from the mist extractor at all times regardless of the pressure drop through the mist extractor.

More specifically, an object of the invention is to provide a method and apparatus for draining the mist extractor of a liquid and gas separator utilizing the energy of the influent for this purpose. In so doing, I provide a jetting apparatus or type of aspirator which utilizes the flow of influent as a means for inducing flow from the drainpipe. In this manner the extent to which flow of drainage from the drainpipe is induced is in more or less direct proportion to the quantity of influent that is being handled by the separator in that as the quantity of influent increases which will normally cause a greater quantity of mist to be extracted by the mist extractor and to drain therefrom through the drainpipe the induced removal of the drainage from the drainpipe will likewise increase in more or less direct proportion. By doing this an automatic normal drainage of all liquids recovered in the mist extractor occurs at all times and no opportunity is afforded for pressure differentials to force drainage liquids up the drainpipe and into the gas outlet.

With the foregoing and other objects in view, which will be made manifest in the following detailed description and specifically pointed out in the appended claims, reference is had to the accompanying drawings for an illustrative embodiment of the invention, wherein:

Figure 1 is a sectional view through one well-known type of oil and gas separator illustrating the present invention as having been embodied therein;

Fig. 2 is a horizontal section taken substantially upon the line 2—2 upon Fig. 1; and Fig. 3 is a horizontal section similar to Fig. 2, but illustrating a slightly modified form of construction.

Referring to the accompanying drawings wherein similar reference characters designate similar parts throughout, there is illustrated on the drawing a suitable tank 10, the inlet to which is indicated at 11 that conducts the liquid and gas or oil and gas that are to be separated into the tank. In conformity with a well-established practice the inlet 11 is either tangentially arranged with relation to the tank or it may enter radially and pass through a diverter 12 which diverts the influent and spreads it in the form of a wide film that whirls against the interior of the tank. This filming of the influent over the interior walls of the tank is highly desirable in that it tends to induce the primary separation of the gas from the liquid or oil. The liquid constituent of the influent settles by gravity from this whirling film to the bottom of the tank and after passing beneath a suitable baffle or shield 13 which serves to shield a float 14 it passes through the oil outlet 15 controlled by a valve, not shown, that is opened and closed by the float 14. In some types of oil and gas separators diaphragm valves are employed to control the oil outlet in lieu of float-operated valves.

The gas that separates from the whirling film ascends within the tank to a mist extractor, generally indicated at 16. A number of different mist extractors have heretofore been designed and any of them may be used for accomplishing the secondary separation of extracting mist from the initially separated gas. All such mist extractors, however, have some means for draining the collected mist therefrom and returning it one way or another to the separated liquid or oil. The mist extractor illustrated is of one well-known type consisting of three concentric cylinders or shells 17, 18, and 19. In the outer shell and near its top there are circumferentially spaced louvers 20 which direct the gas and mist carried thereby in a circumferential direction through the space 21. The gas and mist will thus be whirled between the walls shells 17 and 18 in their descent to radially arranged nipples 22. Here the gas is directed inwardly against shell 19 and after impinging upon this shell it rises past a thief 23 and finally passes to the gas outlet indicated at 24.

Common with all types of mist extractors used in liquid and gas separators, and particularly oil and gas separators, there are one or more drainpipes 25 which normally serve to conduct drainage from the mist extractor to the body of oil that collects in the bottom of the separator tank. Usually, such drainpipes extend to beneath the normal oil level. In accordance with the present invention, however, the drainpipe 25 may terminate well above the normal oil level and a tube 26 connects the drainpipe to a duct 27 formed in the diverter 12. This duct is so arranged with relation to the flow of influent through the diverter as to function as an aspirator so that the influent by its jet action induced flow through the tube 26 from the drainpipe 25. In this manner, the energy of the influent is utilized to induce a reduction in pressure in the drainpipe in opposition to the pressure drop occasioned by the gas passing through the mist extractor. In other and simpler terms, the jetting of the influent creates a suction in the drainpipe which will remove the drainage therefrom and mix it with the influent for re-separation therewith when the influent is filmed on the walls of the tank. It will thus be appreciated that although there may be a considerable pressure drop between the exterior of the mist extractor and the gas outlet 24 that this pressure drop is compensated for or neutralized by the suction created by the jetting of the influent so that under no circumstances will drainage be caused to flow upwardly through the drainpipe and into the mist extractor. Consequently, the mist extractor can freely drain at all times and the capacity of a given size of separator may be materially increased. If the quantity or velocity of flow into the separator is variable and should increase with a consequent greater separation of mist in the mist extractor, this is automatically compensated for by the jet action of the influent creating greater suction in the drainpipe In this manner, withdrawal of drainage from the drainpipe is caused to take place in more or less direct proportion to the amount or velocity of the influent.

In Figs. 1 and 2, the tube 26 is illustrated as being disposed entirely within the separator tank and connected to the diverter. If the inlet to the tank is tangentially arranged or it is desired to connect this tube to the inlet externally of the tank the tube may be arranged as in Fig 3, wherein the tube 26a leads from the drainpipe 25a through the wall of the tank and is connected to the inlet 11a adjacent nozzle 30. The nozzle serves to jet the influent adjacent the end of the tube 27a so as to induce flow of drainage therethrough from the drainpipe.

It will be readily appreciated by those skilled in the art that the present invention enables the construction of a separator wherein the drainpipe may be kept quite short and if desired, the central portion of the separator tank maintained relatively clear of obstruction. Proper operation of the mist extractor is assured at all times and complete separation of liquid from the gas is possible to the maximum efficiency of the separator and its mist extractor.

Various changes may be made in the details of construction without departing from the spirit and scope of the invention as defined by the appended claims.

I claim:

1. A liquid and gas separator comprising a tank providing a chamber within which primary separation of the constituents of the influent may take place, means for introducing a mixed gas and liquid influent into said chamber, mist extracting means for extracting mist from the gaseous constituent separted in said chamber on its way to the gas outlet from the chamber, said mist extracting means having provision for collecting the extracted mist, and means for withdrawing the collected extracted mist from the mist extractor including a conduit leading from the collecting means for the mist to the influent introducing means and arranged to have flow induced therethrough by the influent whereby the extracted mist is returned to the influent and proceeds with the liquid portion thereof, there being outlets from said tank for gas and liquid respectively.

2. A liquid and gas separator comprising a tank, inlet means for continuously introducing a mixed gas and liquid influent thereto for primary separation within the tank, mist extracting means for extracting mist from the gaseous constituent obtained from said primary separation, and means for withdrawing the extracted mist from the mist extractor comprising a continuously open conduit connecting the mist extracting means adjacent its bottom with the inlet means arranged to have flow induced therethrough by the energy of the influent whereby the extracted mist is returned to the influent and proceeds with the liquid portion thereof, there being an outlet from said tank adjacent the bottom thereof for liquid and an outlet from the mist extracting means for gas.

3. A liquid and gas separator comprising a tank, inlet means for continuously introducing a mixed gas and liquid influent thereto for primary separation within the tank, mist extracting means for extracting mist from the gaseous constituent obtained from said primary separation, and means for withdrawing the extracted mist from the mist extractor comprising a continuously open conduit connecting the mist extracting means adjacent its bottom with the inlet means arranged to have flow induced therethrough by the energy of the influent whereby the extracted mist is returned to the influent and proceeds with the liquid portion thereof, there being an outlet from said tank adjacent the bottom thereof for liquid and an outlet from the mist extracting means for gas, said mist extracting means being located within the tank between the level where the influent is introduced and the gas outlet.

CLARENCE D. LAIDLEY.

REFERENCES CITED

The following references are of record in the file of this patent:

UNITED STATES PATENTS

| Number | Name | Date |
|---|---|---|
| 1,747,314 | Mumford | Feb. 18, 1930 |
| 1,874,990 | Hawley | Aug. 30, 1932 |
| 1,916,065 | Mount | June 27, 1933 |
| 1,941,028 | Walker | Dec. 26, 1933 |
| 1,986,168 | Walker | Jan. 1, 1935 |
| 2,223,112 | Lear | Nov. 26, 1940 |